United States Patent [19]

Nakamura et al.

[11] Patent Number: 5,305,217
[45] Date of Patent: Apr. 19, 1994

[54] METHOD AND SYSTEM FOR CONTROLLING AUTOMATIC GUIDED VEHICLE

[75] Inventors: Katsunari Nakamura; Tadae Kita; Kenzi Asano; Tsunezi Shimizu; Motozo Kawakami, all of Kanagawa, Japan

[73] Assignee: Fuji Electric Co., Ltd., Kanagawa, Japan

[21] Appl. No.: 723,614

[22] Filed: Jul. 1, 1991

[30] Foreign Application Priority Data

Jul. 3, 1990 [JP] Japan .................. 2-174451

[51] Int. Cl.⁵ .................. G06F 15/50; G08G 1/123
[52] U.S. Cl. .................. 364/424.02; 364/444; 340/995
[58] Field of Search .................. 364/424.02; 180/167, 180/168, 169; 318/567, 568

[56] References Cited

U.S. PATENT DOCUMENTS

| | | | |
|---|---|---|---|
| 4,513,377 | 4/1985 | Hasebe et al. | 364/449 |
| 4,674,048 | 6/1987 | Okumura | 364/424.02 |
| 4,817,000 | 3/1989 | Eberhardt | 364/443 |
| 4,847,773 | 6/1989 | van Helsdingen et al. | 364/443 |
| 4,984,168 | 1/1991 | Neukrichner et al. | 364/449 |
| 4,987,540 | 1/1991 | Luke, Jr. | 364/424.02 |
| 5,002,145 | 3/1991 | Wakaumi et al. | 180/168 |
| 5,101,351 | 3/1992 | Hattori | 364/424.02 |
| 5,109,344 | 4/1992 | Kakihara et al. | 364/449 |
| 5,113,178 | 5/1992 | Yasuda et al. | 340/709 |

FOREIGN PATENT DOCUMENTS

60-101614 6/1985 Japan .
1-134608 5/1989 Japan .

OTHER PUBLICATIONS

"Programmable Function by ACL Words" no date.

*Primary Examiner*—Thomas G. Black
*Assistant Examiner*—Tan Q. Nguyen
*Attorney, Agent, or Firm*—Finnegan, Henderson, Farabow, Garrett & Dunner

[57] ABSTRACT

A method of controlling a guided vehicle to run along a desired running route comprising the steps of; dividing a display screen into a predetermined grid, wherein the display screen corresponds an area over which the running route is desired, and each grid block corresponds to a portion of the area, establishing a plurality of symbol blocks each symbol block representing a running route segment having a predetermined characteristic, the characteristic being visually represented on the display screen and electronically represented by symbol block data, producing a layout diagram corresponding to the running route by entering a selected pattern of symbol blocks into the display screen grid, extracting electronic symbol block data for each selected symbol block entered and storing the electronic symbol block data, and producing map information corresponding to the stored electronic symbol block, such that the guided vehicle is controlled along the running route by the map information.

14 Claims, 13 Drawing Sheets

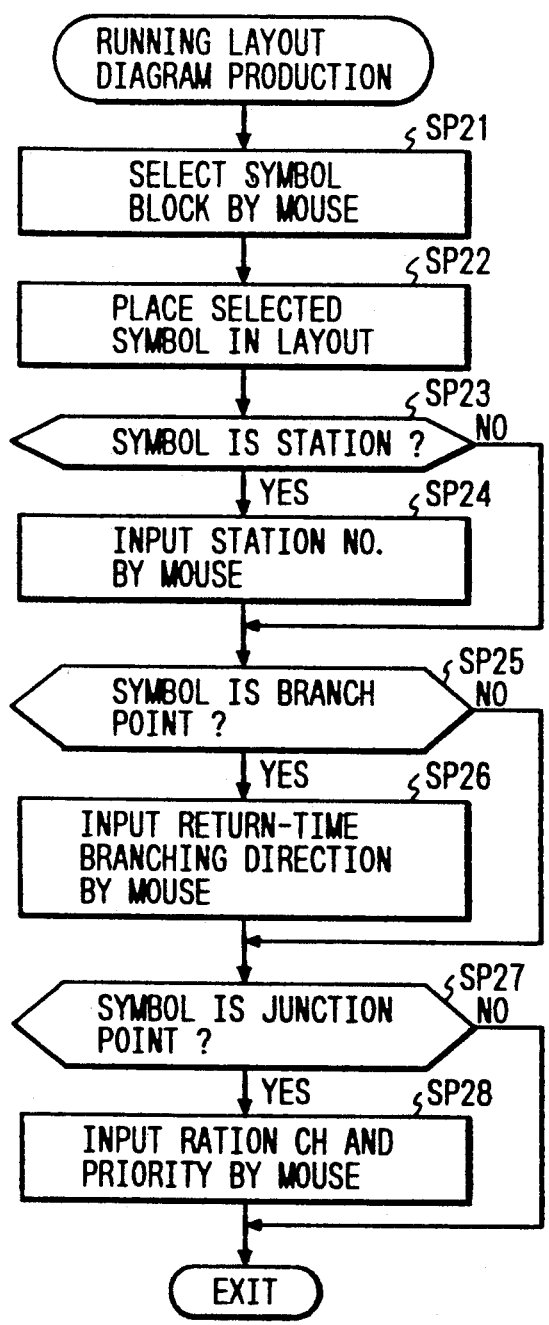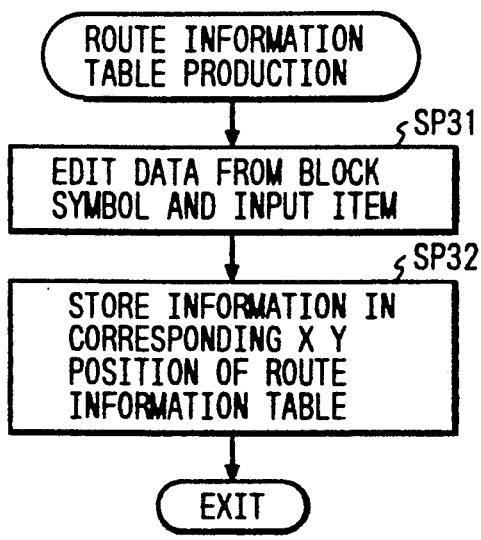

METHOD AND SYSTEM FOR CONTROLLING AUTOMATIC GUIDED VEHICLE

BACKGROUND OF THE INVENTION

1. Field of the Invention

The present invention relates to automatically guided vehicles and, more particularly, it relates to a method and a system for controlling an automatically guided vehicle in which map information relating to the running route of the guided vehicle can be easily generated and running information to be supplied to the guided vehicle can be generated on the basis of the map information by designating a starting station and a terminal station.

2. Discussion of the Related Art

In general, automatically guided vehicles are guided by light, magnetism, etc. through the use of, for example, guide lines and signal marks. FIG. 15 shows a model of a running route for a guided vehicle in which a guide line is laid on a running route and signal marks are provided on one or both sides of the guide line.

In the following example, a running route model is described for a case where the guided vehicle travels from a designated home station (hereinafter abbreviated as "HS") to a third station (hereinafter abbreviated as "ST3"). The guided vehicle receives running information corresponding to a sequence of signal marks and stores this running information in memory. That is, the guided vehicle stores running information as shown in Table 1 corresponding to signal marks SM1-SM5 in advance and receives information whenever a signal mark is detected, such that the guided vehicle runs according to the updated control information. Unfortunately, in this type of system, it is difficult or impossible to generate running information from a command instruction, such as, "Go from HS to ST3." In other words, it is difficult to derive running information from starting station-to-terminal station information (hereinafter also called "FROM-TO information" or abbreviated as "F/T information").

TABLE 1

| Signal Mark Sequence | Control Information |
| --- | --- |
| SM1 | Run at a high speed. |
| SM2 | Run at a low speed, turn to the right. |
| SM3 | Run at a high speed. |
| SM4 | Run at a low speed. |
| SM5 | Stop. |

The following two methods are known as conventional techniques for generating running information from F/T information.

1. Pattern Method

This method comprises the steps of determining running patterns (running routes) corresponding to respective F/T information in advance, and generating running information corresponding to respective running patterns. This method essentially generates a table establishing correspondence between signal marks and control information and stores running information in the guided vehicle. In this method, running information corresponding to the number of patterns must be stored in memory or otherwise retained. Accordingly, this method suffers disadvantages in cases where the number of running routes (patterns) is large or where a particular running route is very detailed.

2. Map Method

This method comprises the steps of storing map information corresponding to various stations, routes and signal marks before actual operation, and generating running information from F/T information on the basis of the map information. This method provides excellent system flexibility. Accordingly, this method can be applied to the case where the map information is complex, such as, detailed running routes and/or numerous running patterns. This method has been described in Japanese Patent Unexamined Publication No. Sho-60-101614. According to the Japanese Patent Unexamined Publication No. Sho-60-101614, the map method is accomplished by the following general steps.

(1) Generation of Running Layout

A running layout such as the one shown in FIG. 15 is manually generated as a desk plan. That is, the positions of the stations, the running routes and the signal marks are manually determined.

(2) Generation of Map Information

The running routes are manually classified into a group of linear portions and a group of junction/branch portions as part of the desk plan on the basis of the running layout. Lists of the respective portion are generated and signal marks and stations contained in each of the respective linear portions and the respective junction/branch portions are manually written in the lists.

(3) Loading of Map Information

Map information is manually input into a control system on the guided vehicle or in a ground control panel through a predetermined loader or console.

(4) Conversion of F/T Information into Running Information

When F/T information is transmitted from a command system to the ground control panel or the guided vehicle, the control system converts the F/T information into running information on the basis of the map information already stored.

The aforementioned map method, however, has several problems. The respective aforementioned steps (1)-(3) require a lot of labor and time and errors often occur because of the manual nature of the work. Furthermore, Operators require special knowledge or training. In addition, when modification to the layout is required steps (1)-(3) must be redone.

SUMMARY OF THE INVENTION

The present invention has been made in view of the above circumstances and has as an object to provide a method and a system for controlling a guided vehicle in which map information and running information can be generated in an automated fashion.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a method of controlling a guided vehicle to run along a desired running route comprising the steps of; dividing a display screen into a predetermined grid, wherein the display screen corresponds an area over which the running route is desired, and each grid block corresponds to a portion of the area, establishing a plurality of symbol blocks each symbol block representing a running route segment having a predetermined characteristic, the characteristic being visually represented on the display screen and electronically represented by symbol block data, producing a layout diagram corresponding to the running route by entering a selected pattern of symbol blocks into the display screen grid, extracting electronic symbol block data for each selected symbol block entered and storing the electronic symbol block data, and producing map information corresponding to the stored electronic symbol block, such that the guided vehicle is controlled along the running route by the map information.

BRIEF DESCRIPTION OF THE DRAWINGS

The accompanying drawings, which are incorporated in and constitute a part of this specification illustrate embodiment(s) of the invention and, together with the description, serve to explain the objects, advantages and principles of the invention. In the drawings.

FIGS. 5 through 14 are flow charts explaining the operation of the system; and

DETAILED DESCRIPTION OF THE PREFERRED EMBODIMENTS

The present invention will be described below with reference to the drawings.

In general, the foregoing objects of the invention are obtained by generating map information according to the following procedure.

(1) A screen, cathode ray tube or similar display device (hereinafter abbreviated as "CRT"), is divided into a X-Y grid of predetermined blocks or boxes.

(2) Minimum units constituting characteristics of the desired running route for the guided vehicle, that is, unit symbol blocks, are determined and established in advance and registered in a computer which controls the CRT. These unit symbol blocks respectively correspond to running route characteristics such as straight portions, curve portions, junctions, branches, running route stations, the presence of a signal mark, etc.

(3) Unit symbol blocks are successively selected and entered into the grid blocks on the CRT by using a mouse or the like to form a layout diagram.

All the procedures thereafter are automatically performed whereby electronic data representing the selected and entered symbol blocks are stored and processed to generate map information upon designation of a starting station and terminal station (i.e. F/T information).

Accordingly in the present invention, all the information necessary for generating map information is included in the unit symbol blocks and hence map information is generated by simply manually arranging these unit symbol blocks on the CRT display. Running route information representing a route between designated start and terminal points and running information can be automatically generated simply by inputting F/T information on the basis of the map information.

Figure 1:
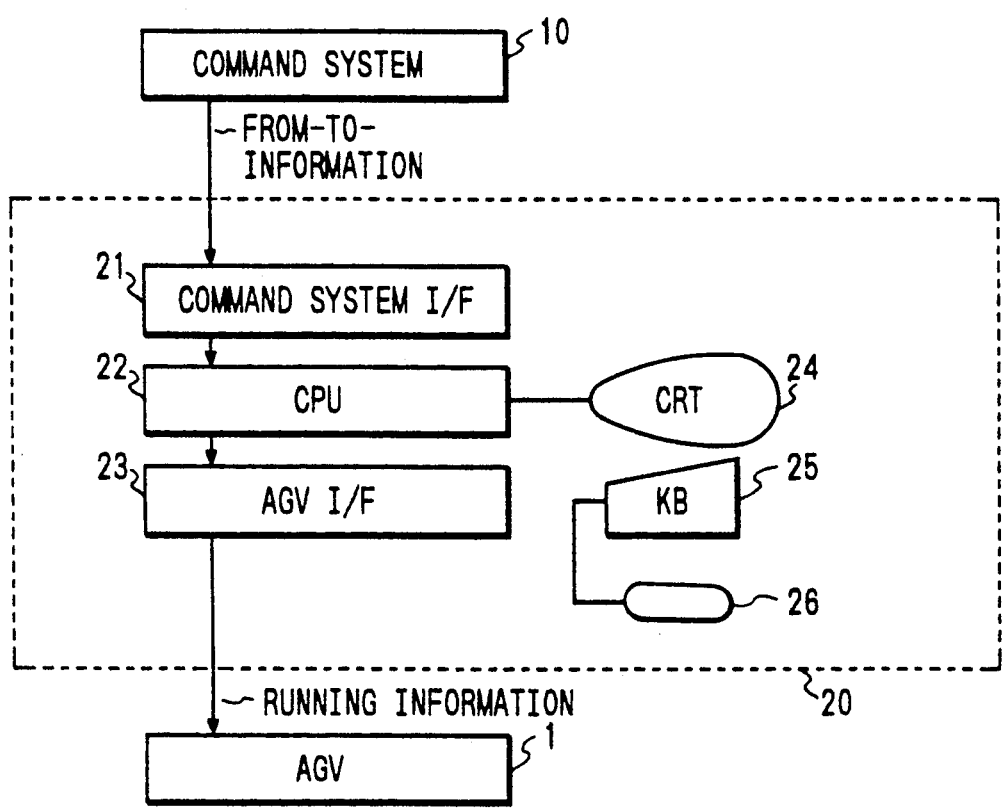
FIG. 1 is a block diagram showing an outline of an automatically guided vehicle control system as an embodiment of the present invention.

FIG. 1 shows an outline of a guided vehicle control system. In FIG. 1, a command system 10 is provided to control the automatic conveyance system and supplies F/T information to a ground controller 20. The ground controller 20 generates running information on the basis of map information and the F/T information and supplies the running information to the guided vehicle (hereinafter abbreviated as "AGV") 1. The ground controller 20 has a higher rank system interface (I/F) 21 for communication with the command system, a central processing unit (CPU) 22, and a guided vehicle interface 23 for transmitting information to the automatic guided vehicle by optical transmission in a home station. A cathode ray tube display device (hereinafter abbreviated as "CRT") 24, a keyboard (KB) 25 and a mouse 26 are connected to the CPU 22.

Figure 2:
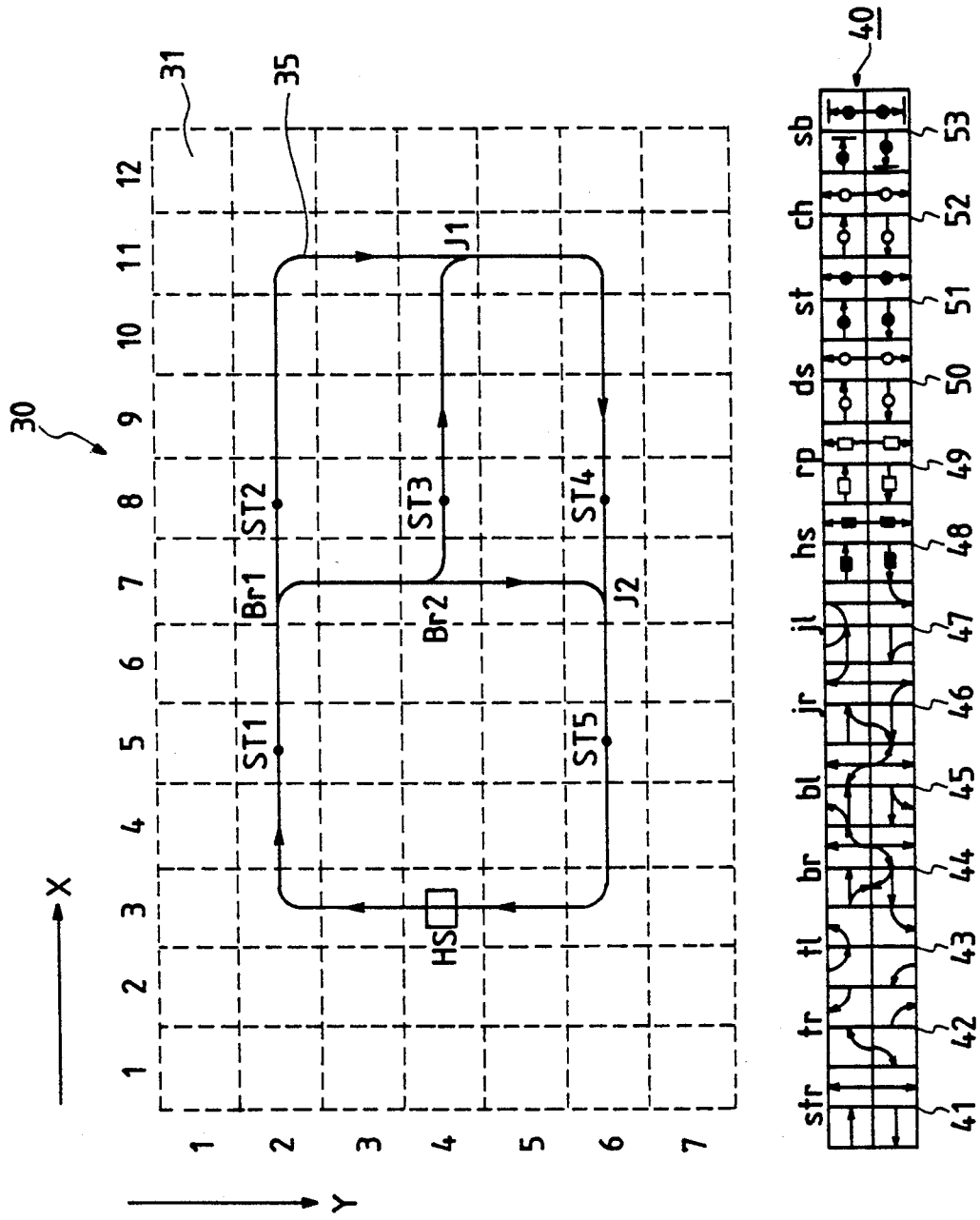
FIG. 2 is a front view showing an example of a running layout diagram displayed on a CRT screen and symbol blocks in the same embodiment.

FIG. 2 shows a CAT screen 30. The CRT screen 30 is separated into checker-patterned blocks 31. All unit symbol blocks 40 are displayed on the lower portion of the screen. The symbol blocks 40 include symbol blocks corresponding to the terms of straight 41, right-turn 42, left-turn 43, a right-branch 44, a left-branch 45, a right-junction 46, a left-junction 47, a home station 48, a return position 49, a dummy station 50, a station 51, a charging station 52, and a switching-back station 53. These symbol blocks can be respectively and suitably entered in the checker-patterned blocks 31 by using the mouse 26. By continuing the entering operation, a running layout diagram 35 as shown in FIG. 2 can be displayed on the CRT screen 30. For example, these symbol blocks can be placed as follows. The right-turn 42, the straight 41, the station 51, the straight 41 and the right-branch 44 are placed on blocks shown by the coordinates (3, 2), (4, 2), (5, 2), (6, 2) and (7, 2) in an X-Y coordinate system, respectively.

Figure 3:
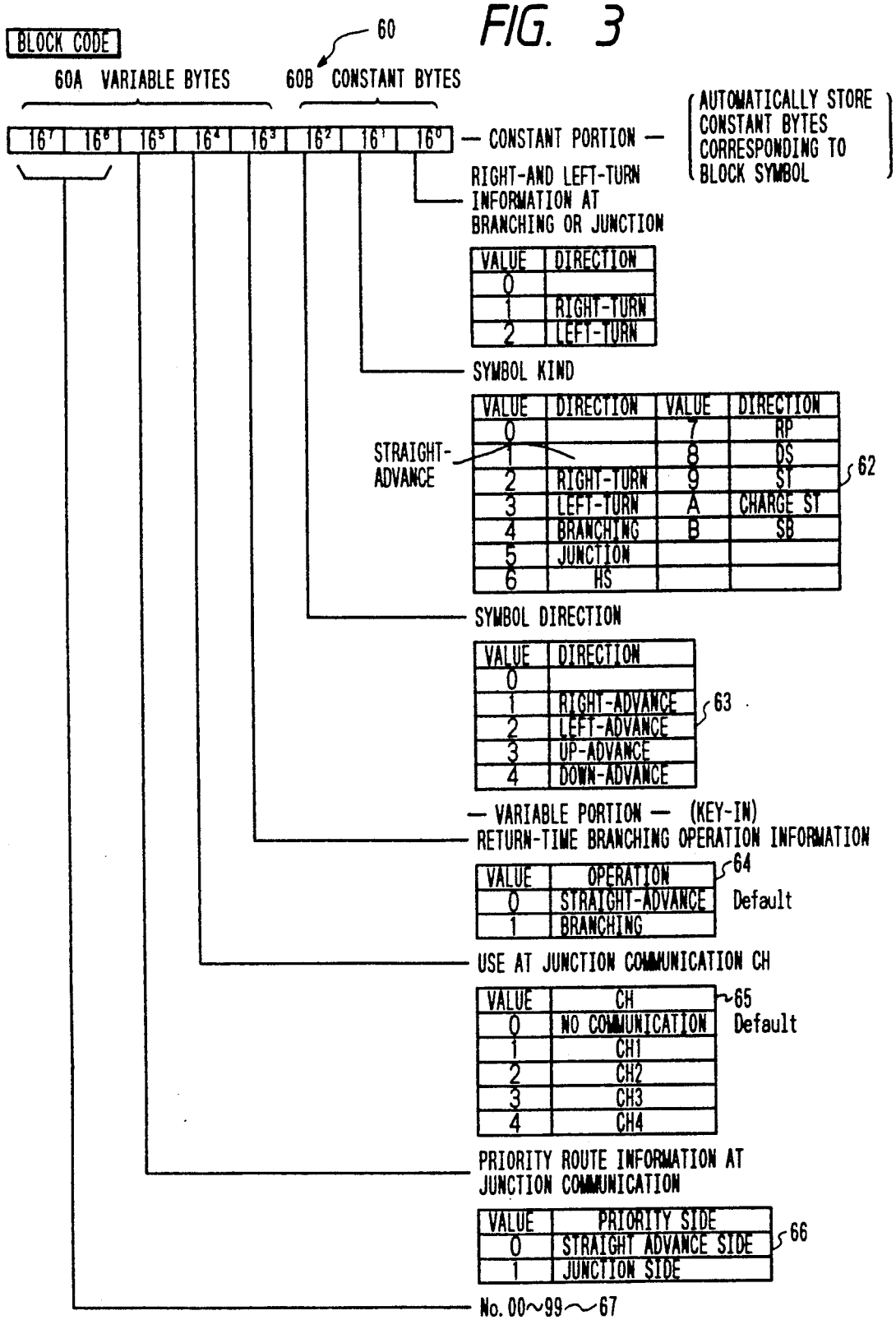
FIG. 3 is a view showing the configuration of block codes.

When the aforementioned entering operation is performed manually, a block code 60, such as the one shown in FIG. 3, is stored for every block. As shown in FIG. 3, one block code is composed of eight bytes. Among the eight bytes, upper five bytes are variable bytes 60A which can be changed by the entering operation through the keyboard 25 or mouse 26. The lower three bytes are constant bytes 60B which are automatically stored by entering a unit block. For example, the constant bytes can be recorded as follows. Right-turn or left-turn information 61 at the time of branching or junction is recorded in the lowermost byte of the byte number 0. The kind 62 of the unit symbol block 40 is recorded in the second lower byte of the byte number 1. The direction (right-advance, left-advance, up-advance or down-advance) 63 of the unit symbol block 40 is recorded in the third lower byte of the byte number 2.

Figure 4:
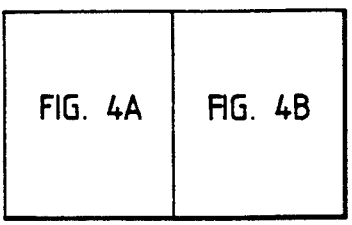
FIG. 4 comprises FIG. 4A and FIG. 4B, which is a conceptual view showing the configuration of a route information table and a branch information table and the configuration of various kinds of tables used for generating running information from F/T information, which tables are provided in a memory of a central processing unit (CPU)
Figure 4A:
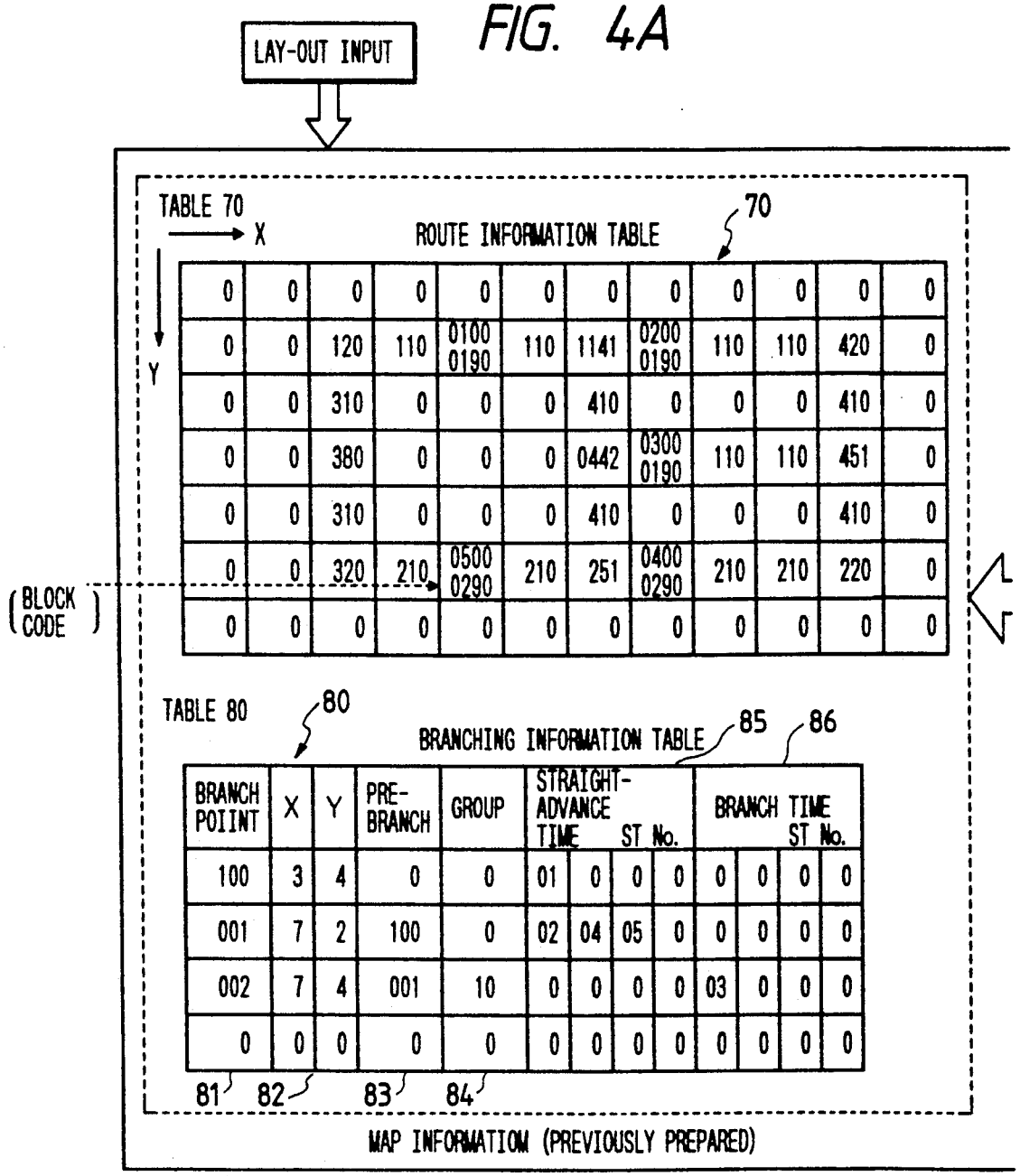
Figure 4B:
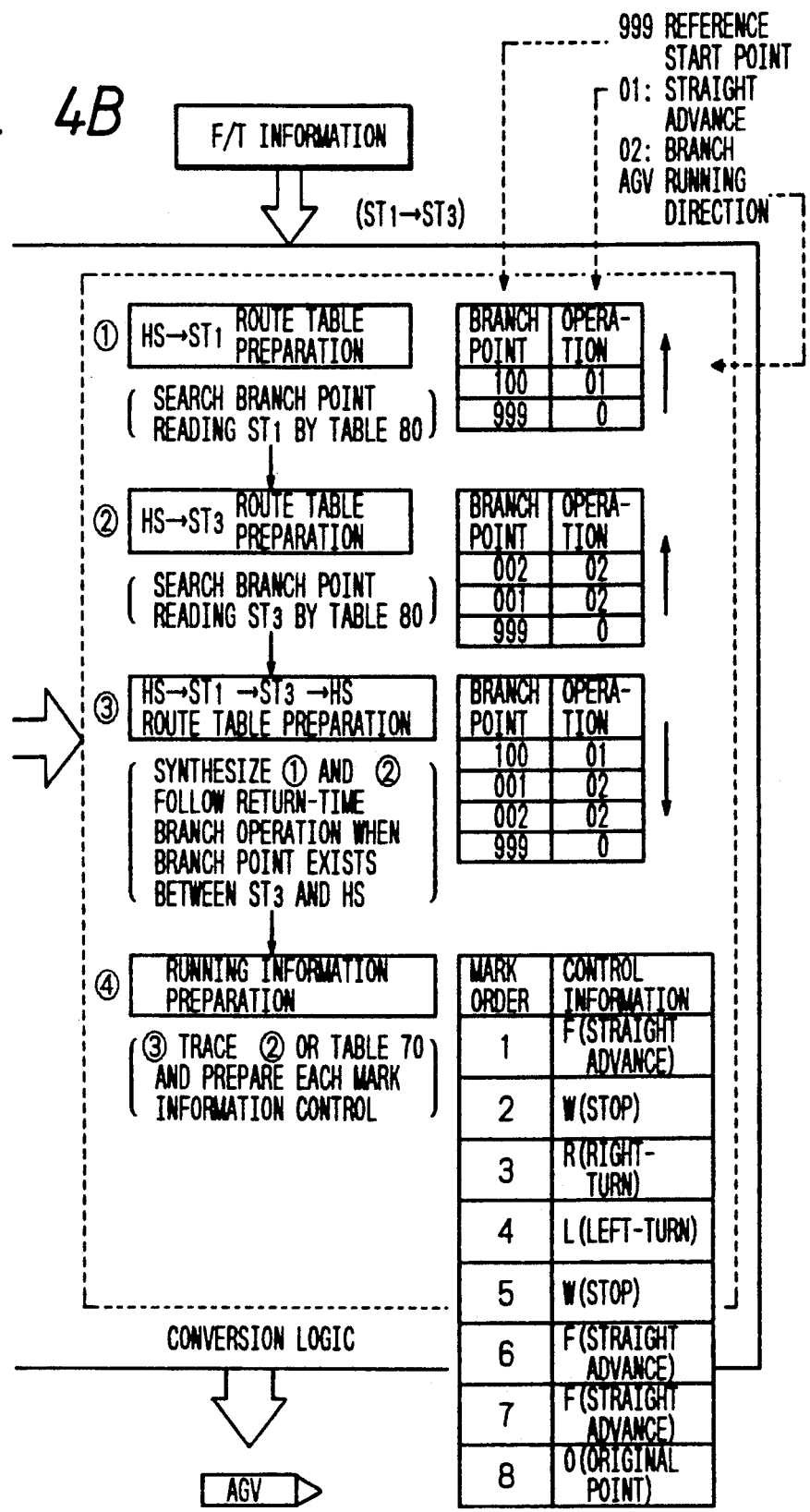

In respect to the variable bytes 60A, return-time branching operation information 64 representing whether the vehicle is to advance straight or to turn at the block when the vehicle returns from the terminal station to the home station, information 65 representing whether communication is required at the time of junction and representing the channel used for communication, priority route information 66 representing whether priority is given to a straight-advance side or a junction side at the time of junction, and station number 66 are recorded. These information data are stored in a route information table 70 as shown in FIG. 4. With respect to the information data 64, 65 and 66 in the variable portion 60A, predetermined data (default data) are recorded if there is no designation through the keyboard 25 or mouse 26.

In FIG. 4, the route information table 70 corresponds to the layout shown in FIG. 2. For example, data "120" is stored in the coordinates (3, 2). When the data is collated with the block code 60 shown in FIG. 3, the value "1" of information 63 is decoded to right-advance and the value "2" of information 64 is decoded to right-turn. For example, data "1141" is stored in the coordinates (7, 2). In the data, the value "1" of information 64 is decoded to return-time branch and the values "1", "4" and "1" of information 63, 62 and 61 are decoded to right-advance, branch and right-turn, respectively. The term "return-time branch" used herein represents the route in which the vehicle returns to the home station by turning to right without advancing straight at the branch point 1 (Br1) in the case where the vehicle returns from the station 1 (ST1) to the home station (HS). This is because this route is shorter. As described above, the route information table 70 is automatically and easily produced by entering unit symbol blocks 40 in the blocks 31 on the CRT screen 30.

A branch information table 80, shown in FIG. 4, is also produced. This table 80 has a column 81 showing branch points (including the home station HS represented by "100" in this table), a column 82 showing the coordinates (X, Y) of the branch points, a column 83 showing preceding branch points, a group column 84 showing the number of a closed-loop containing the respective branch point in the column 81, a column 85 showing the numbers of the stations which the vehicle passes at the time of straight advance at the respective branch points, and a column 86 showing the numbers of the stations which the vehicle passes at the time of branching.

For example, the following information is recorded in the first line of the branch information table 80.

| | |
|---|---|
| Column 81: | The branch point is No. 100 (representing the home station HS in this exemplary case). |
| Column 82: | The coordinates of the branch point 100 are (3, 4). |
| Column 83: | There is no branch point ("0") preceding the branch point 100. |
| Column 84: | The branch point 100 is contained in a main loop (which is formed by straight advance at all branch points to circulate from the home station HS to the home station HS). |
| Column 85: | When the vehicle advances straight at the branch point 100, the station which the vehicle passes before reaching the next branch point (Br1) is a station ST1. |
| Column 86: | When the vehicle turns at the branch point 100 (in this case, the turning is, however, practically impossible because the branch point 100 is not a branch point but a home station HS), there is no station which the vehicle passes before reaching the next branch point. |

The following information is recorded in the second line of the branch information table 80.

| | |
|---|---|
| Column 81: | The branch point is No. 001 (representing the branch point Br1) |
| Column 82: | The coordinates of the branch point 001 are (7, 2). |
| Column 83: | The branch point preceding the branch point 001 is the home station HS ("100"). |
| Column 84: | The branch point 001 is contained in the main loop. |
| Column 85: | When the vehicle advances straight at the branch point 001, the stations which the vehicle passes before reaching the next branch point (HS) are stations ST2, ST4 and ST5. |
| Column 86: | When the vehicle turns at the branch point 001, there is no station which the vehicle passes before reaching the next branch point. |

The following information is recorded in the third line of the branch information table 80.

| | |
|---|---|
| Column 81: | The branch point is No. 002 (representing the branch point Br2). |
| Column 82: | The coordinates of the branch point 002 are (7, 4). |
| Column 83: | The branch point preceding the branch point 002 is the branch point Br1 ("001"). |
| Column 84: | The branch point 002 is contained in a subsidiary loop (another loop than the main loop). |
| Column 85: | When the vehicle advances straight at the branch point 002, there is no station which the vehicle passes before reaching the main loop. |
| Column 86: | When the vehicle turns at the branch point 002, the station which the vehicle passes before reaching the main loop is a station ST3. |

The CPU 22 produces the branch information table 80 by tracing the route information table 70. After map information is produced as described above, the CPU 22 produces running information for the guided vehicle on the basis of the map information and F/T information. The guided vehicle 1 is usually in the home station and is so controlled that the vehicle returns to the home station HS after running. The case where F/T information 90 "run from the station ST1 to the station ST3" is given will be described as an example with reference to FIG. 4.

1. Production of a Home Station (HS)-Station (ST1) Route Table 91

The station ST1 is found by searching both the straight-advance-time ST column 85 and the branch-time ST column 86. It is known that ST1 exists in the straight-advance-time ST column 85 with respect to the branch point 100. Accordingly, it is known that the vehicle can reach the station ST1 by advancing straight from the branch point 100, that is, the home station HS. The route table 91 is produced to record this information. In the route table 91, "100" is recorded in the branch point column thereof and "01" (straight advance) is recorded in the action column thereof. Here, "999" in the branch point column of the route table represents a table reference starting point (end point).

2. Production of a Home Station (HS)-Station (ST3) Route Table 92

The station ST3 is found by searching both the straight-advance-time ST column 85 and the branch-time ST column 86. It is known that ST3 exists in the straight-advance-time ST column 85 with respect to the branch point 002. It is obvious from the preceding branch column 83 that the branch point preceding the branch point 002 is "001". From these information data, it is known that the vehicle can reach the station ST3 by turning at the branch points Br1 and Br2. These information data are written in the route table 92.

3. Production of an HS-ST1-ST3-HS Route Table 93

A route table 93 is synthesized from the two route tables 91 and 92. That is, a route table 93 having the content that the vehicle advances straight (01) from the home station HS (100) to the station ST1, turns (02) at the branch point Br1 (001), turns (02) at the branch point Br2 (002) and finally reaches the station ST3 is produced.

4. Production of Running Information

A running information table 94 is produced by reference to the route table 93, the route information table 70 and the branch information table 80. In this case, signal marks are respectively provided in the following positions, so that the CPU 22 judges from each block symbol 40 whether a signal mark is present or not. That is, when the given block symbol is one selected from the branch points 44 and 45, home station 48, station 51, etc., the presence of a signal mark is judged. When the given block symbol is, on the contrary, one selected from the straight-advance 41, right-turn 42, left-turn 43, junctions 46 and 47, etc., the absence of any signal mark is decided. In this specification, the position (block) where a signal mark exists is called "node".

| Signal Mark Sequence | Position |
| --- | --- |
| 1 | HS |
| 2 | ST1 |
| 3 | Br1 |
| 4 | Br2 |
| 5 | ST3 |
| 6 | ST4 |
| 7 | ST5 |
| 8 | HS |

Information which shows the action to be made by the guided vehicle whenever a signal mark is detected is running information. This information is produced as follows.

(1) Control information "advance straight (01) from the home station HS (100)" is obtained by reference to the route table 93. As a result, F (forward) is written in the control signal column of the running information table 94 with respect to the signal mark sequence 1. The term "forward" used herein means that the vehicle goes forward without turning at the branch point. Accordingly, the term "forward" includes right-turn and left-turn as long as the road is unforked.

(2) The coordinates (3, 4) of the home station HS are read from the X and Y columns of the branch information table 80 with respect to the branch point "100", so that the value "360" is read from the coordinates (3, 4) in the route information table 70. This value is put in the lower three bytes in FIG. 3, so that up-advance is recognized from the table 63. Accordingly, it is recognized that the coordinates of the next block are (3, 3). The value "320" of the coordinates (3, 3) is read. Because this value also represents up-advance, the value "120" of the coordinates (3, 2) is read as the content of the next block. Because the value "120" represents right-turn in the table 63, the value of the coordinates (4, 2) is read as the content of the next block. As described above, the route of the guided vehicle is traced on the route information table 70.

(3) After tracing is continued till the vehicle reaches the station ST1 (5, 2), the CPU 22 recognizes the presence of a signal mark 2 and writes the control information "stop and work (W)" in the running information table 94.

(4) The CPU 22 further traces the route information table 70 and finds that a branch point Br1 exists in the coordinates (7, 2). The CPU 22 searches the route table 93 for the branch point Br1 and recognizes that the road branches (02) at the branch point Br1. Further, the CPU 22 reads the value "1141" from the route information table 70, puts this value in the lower four bytes of the block code 60 and recognizes from the table 61 that the direction of the branch is right. Accordingly, the CPU 22 writes right-turn (R) in a position of the running information table 94 with respect to the signal mark 3.

(5) Then, the CPU 22 recognizes that the branch point Br2 (7, 4) shows left-turn and writes left-turn (L) in a position of the running information table 94 with respect to the signal mark 4.

(6) When the vehicle thus reaches the station ST3 (8, 4), the CPU 22 recognizes the station ST3 and writes control information "stop and work (W)" in a position of the running information table 94 with respect to the signal mark 5.

(7) Then, the CPU 22 continues tracing as described above and recognizes that signal marks exist in the stations ST4 and ST5. The CPU 22 recognizes that each of these stations is neither FROM.ST nor TO.ST and writes "forward" (F) in positions of the running information table 94 with respect to the signal marks 6 and 7.

(8) Then, the CPU 22 searches for the home station HS and writes the origin (0) in a position of the running information table 94 with respect to the signal mark 8.

The running information table 94 shown in FIG. 4 is thus produced. The guided vehicle 1 receives running information from the running information table 94 by instructions from the CPU 22 and runs according to the content of the running information table 94 whenever a signal mark is detected.

FIGS. 5 through 14 are flow charts showing the operation of the system in this embodiment. Although the above description is made for the case where F/T information represents station ST1/ station ST3, these flow charts show the case where F/T information is generalized.

Figure 5:
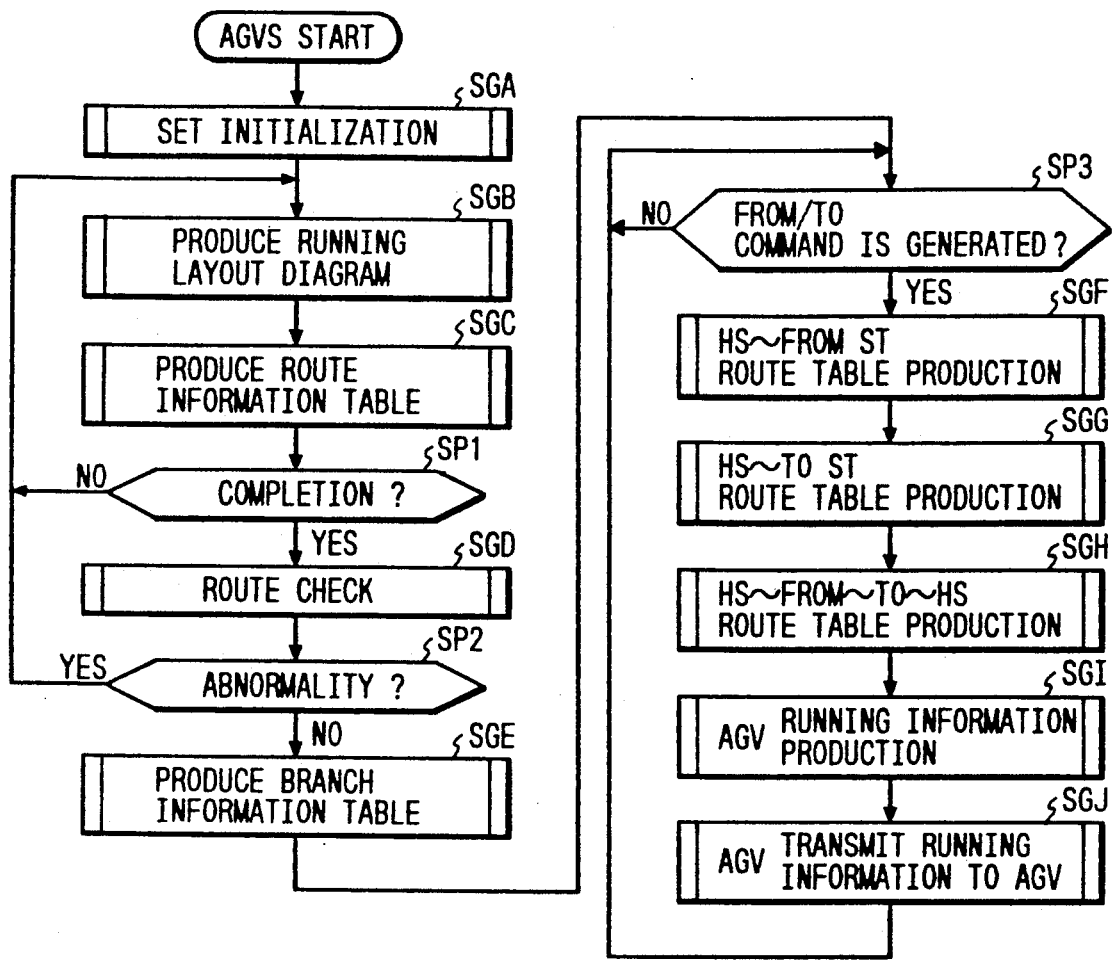

FIG. 5 is a flow chart showing the operation of this system as a whole. In FIG. 5, the stages SGA-SGJ form subsidiary routines, respectively. First, initialization is made in the stage SGA. Then, in the stage SGB, a running layout diagram 35 as shown in FIG. 2 is produced. Then, in the stage SGC, a route information table 70 as shown in FIG. 4 is produced on the basis of the layout diagram 35. When the running layout diagram and the route information table 70 are completed (step SP1), route check is made in the stage SGD to check abnormality such as route breaking (step SP2). Then, in the stage SGE, a branch information table 80 as shown in FIG. 4 is produced.

When F/T information 90 is generated here (step SP3), a route table 91 representing a route from the home station HS to the starting station (FROM.ST) is produced in the stage SGF. Thereafter, a route table 92 representing a route from the home station HS to the terminal station (TO.ST) and a HS-FROM.ST-TO.ST-HS route table 93 are produced in the stages SGG and SGH, respectively.

Then, a running information table 94 is produced in the stage SGI and is transferred to the guided vehicle in the stage SGJ.

Figure 6:
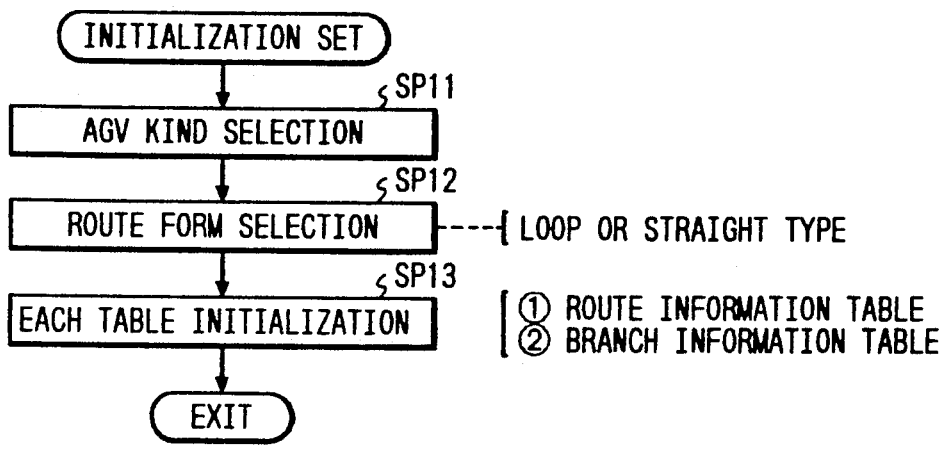

FIG. 6 is a flow chart of the initialization routine. First, in the step SP13, the kind of the guided vehicle (AGV) 1 is selected/designated. In the step SP12, route form is selected correspondingly to the shape of the road, loop or straight line. Then, in the step SP13, the route information table 70 and the branch information table 80 are initialized.

FIG. 7 is a flow chart in the case where a running layout diagram 35 as shown in FIG. 2 is produced by placing a symbol block 40 in the block 40 of the CRT 24.

First, in the step SP21, a desired block is selected from symbol blocks 40 by using the mouse 26. Then, in the step SP22, the selected symbol block is placed in a desired block on the CRT screen 30. Then, the variable portion of the symbol block is designated through the mouse 26 if it must be changed. That is, when the symbol block represents a station ST, the situation of the flow chart goes from the step SP23 to the step SP24. In the step SP24, a corresponding station number is selected, through the mouse 26, from the numbers of stations ST displayed on the CRT screen and is inputted. When the symbol block represents a branch point Br, the situation of the flow chart goes from the step SP25 to the step SP26. In the step SP26, the branch bit of the table 64 is set by using the mouse 26 as long as the vehicle turns at the branch point Br at the time of return. When the symbol block represents a junction point, the situation of the flow chart goes from the step SP27 to the step SP28. In the step SP28, a channel used for wireless communication and priority information are inputted through the mouse 26. One symbol block is thus selected and placed in a desired block 31 on the CRT screen 30. Accordingly, the running layout diagram 35 can be produced by repeating the aforementioned operation. In this case, the constant portion of the block code 60 is automatically decided by the CPU 22 when the symbol block is selected.

FIG. 8 is a flow chart showing the procedure of producing the route information table 70. Upon completion of the selection of the symbol block, the inputting of the constant portion of the block code 60 and the inputting of the variable portion of the block code 60 correspondingly to necessity are completed, the CPU 22 extracts necessary information from the symbol block and edits it (step SP31). Then, information extracted from the block code 60 is stored in a corresponding position of the route information table 70 shown in FIG. 4 (step SP32). A route information table 70 is thus produced successively with respect to blocks.

Figure 9:
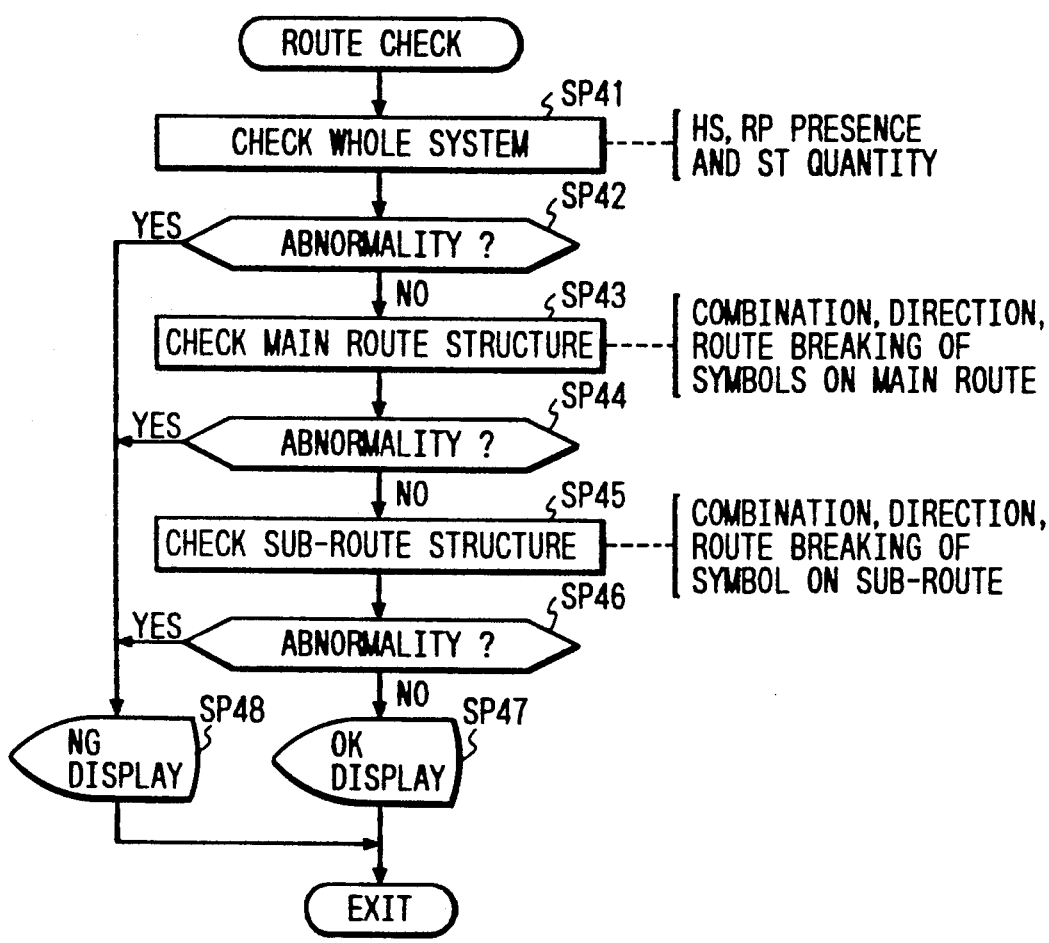

FIG. 9 is a flow chart of the route check routine for checking the route inputted as described above on the route information table 70.

First, in the step SP41, this system is checked as a whole. That is, the presence or absence of home stations HS and return positions RP, the numbers of home stations, the numbers of return positions and the numbers of stations ST are checked. If there is something abnormal even in one of them, the situation of the flow chart goes from the step SP42 to the step SP48 to perform failure display. When there is nothing abnormal in the system as a whole, the situation of the flow chart goes from the step SP42 to the step SP43 to perform second check for checking the structure of the main route. That is, failure in the combination of symbols on the main route, failure in the directions of the symbols, failure such as route breaking, etc. are checked. If there is something abnormal even in one of them, the situation of the flow chart goes from the step SP44 to the step SP48 to perform failure display. The term "main route" used herein means a route in which the vehicle advances straight at all branch points and returns to the home station HS.

When there is nothing abnormal in the main route, the situation of the flow chart goes from the step SP44 to the step SP45 to perform third check for checking the structure of a subsidiary route. That is, failure in the combination of symbols on the subsidiary route, failure in the directions of the symbols, failure such as route breaking, etc. are checked. If there is something abnormal even in one of them, the situation of the flow chart goes from the step SP46 to the step SP48 to perform failure display (NG). When there is nothing abnormal in the subsidiary route, the situation of the flow chart goes from the step SP46 to the step SP47 to perform success display (OK). The concept "subsidiary route" contains all routes except the main route.

When the layout diagram 35 is thus normally inputted by using symbol blocks, procedures after that are carried out automatically. First, a branch information table 80 is produced.

Figure 10:
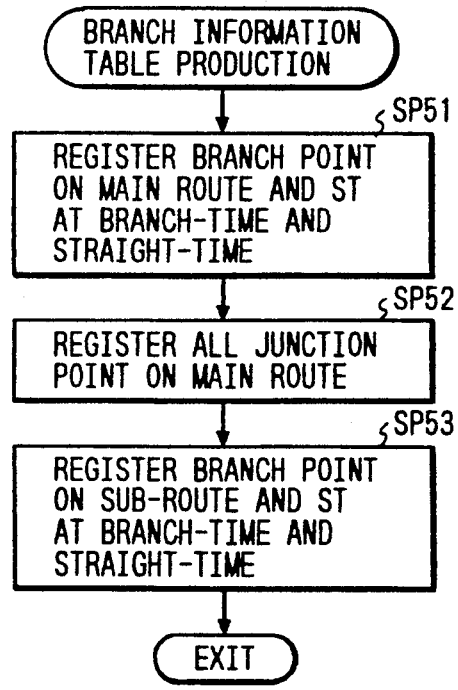

FIG. 10 is a flow chart showing the procedure of producing the branch information table 80. First, in the step SP51, branch points (including the home station HS) on the main route are read from the route information table 70, so that the coordinates of the branch points are registered. Stations between a branch point and the next branch point are registered while the route is classified into the case where the vehicle advances straight and the case where the vehicle turns at the branch point. Then, in the step SP52, junction points on the main route are all registered in a table not shown. These junction points are used for deciding sections of subsidiary routes. Then, in the step SP53, the coordinates of branch points on a subsidiary route are registered and, at the same time, stations which the vehicle passes before reaching a junction point on the main route are all registered while the route is classified into the case of straight-advance and the case of branch. The branch information table 80 is completed by repeating the aforementioned procedure.

Figure 11:
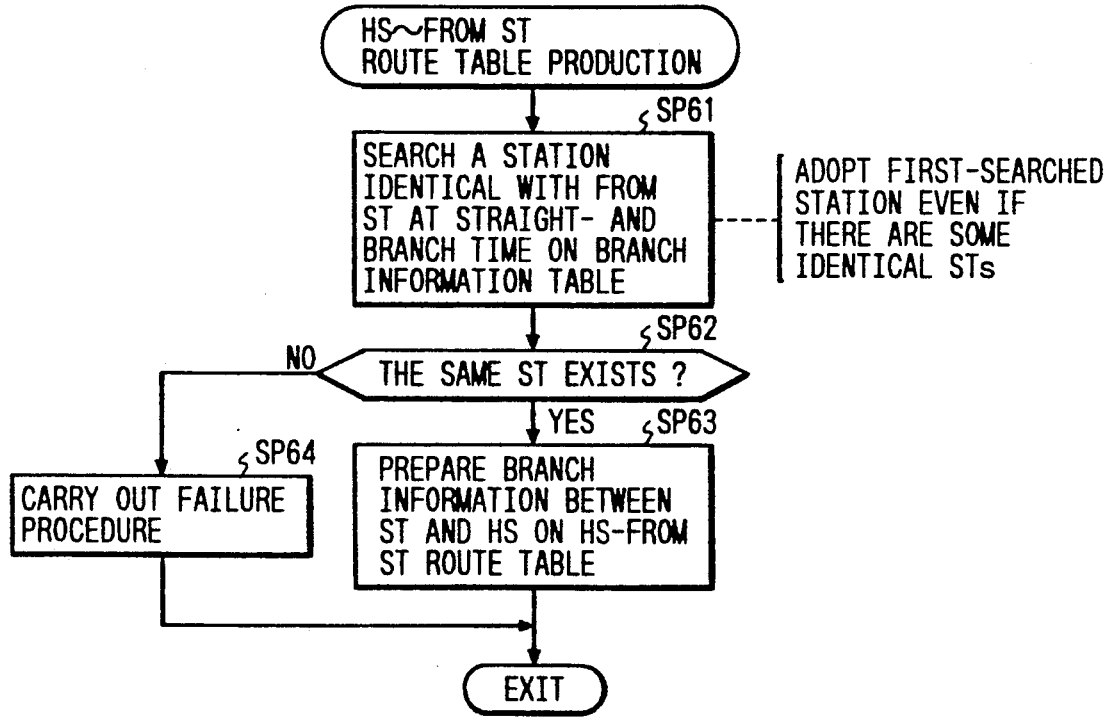

FIG. 11 is a flow chart showing the routine of producing an HS-FROM.ST route table 91. This routine is a routine for searching for the route from the home station HS to the starting station (FROM.ST). First, in the step SP61, the straight-advance-time station column 85 and the branch-time station column 86 of the branch information table are searched for a station identical with FROM.ST. If there is no identical station, that is, if there is something abnormal, the situation of the flow chart goes from the step SP62 to the step SP64 to carry out a failure procedure. When an identical station is found, the situation of the flow chart goes from SP62 to the step SP63, in which branch information representing the respective numbers of the branch points between FROM.ST and the home station HS and representing whether the vehicle is to advance straight or to turn at each of the branch points is written in the route table 91. At the point of time the table 91 is completed, "999" is written in the column with respect to the last branch point. This is called "reference starting point" and suggests that FROM.ST is just above this point.

Figure 12:
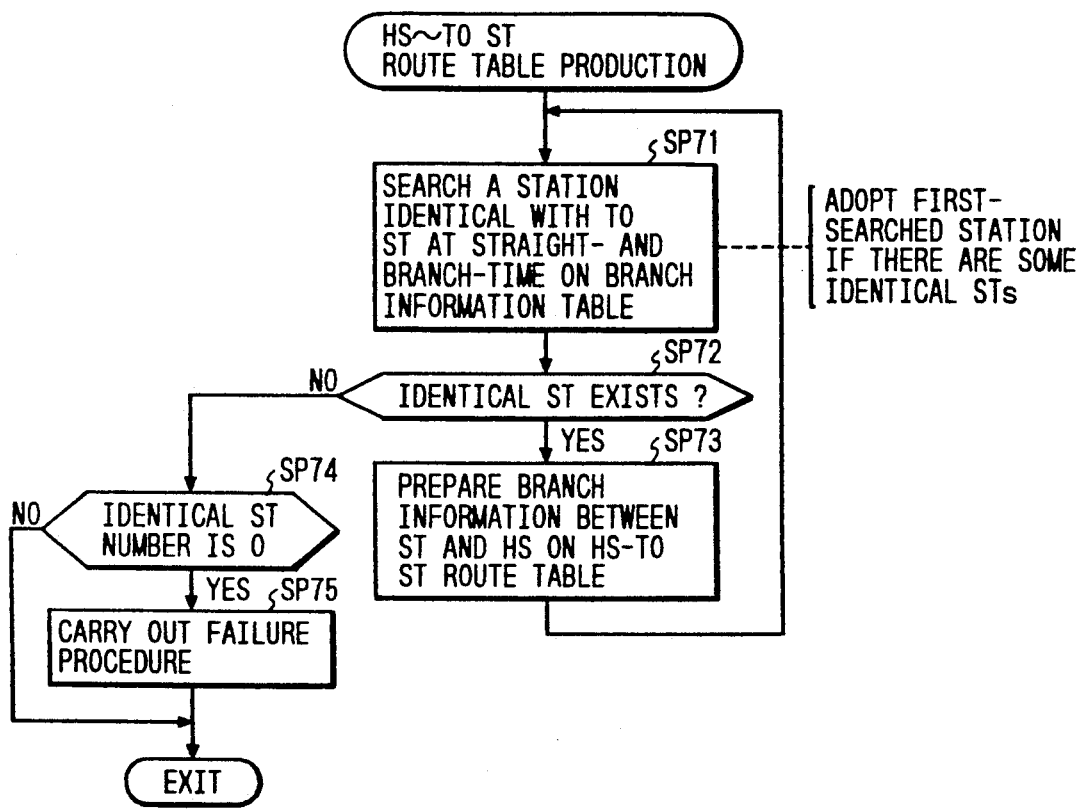

FIG. 12 is a flow chart showing the routine of producing an HS-TO.ST route table 92. This routine is a routine for searching for the route from the home station HS to the terminal station (TO.ST). First, in the step SP71, the straight-advance-time station column 85 and the branch-time station column 86 of the branch information table 80 are searched for a station identical with TO.ST. In the case where there are a plurality of routes to TO.ST, this TO.ST exists in a plurality of positions in the columns 85 and 86 of the branch information table 80. In this case, route tables for all routes, this is, for all identical terminal stations TO.ST, are produced.

If there is no terminal station TO.ST, that is, if there is something abnormal, the situation of the flow chart goes from the step SP72 to the step SP74 to carry out a failure procedure. When an identical station is found, the situation of the flow chart goes from SP72 to the step SP73, in which branch points between TO.ST and the home station HS are examined by performing tracing from TO.ST to the home station HS in the reverse direction, to thereby produce branch information of the branch points in the route table 92. For example, in the route table 92 shown in FIG. 4, branch points are written as follows. First, the branch point "002" (Br2) is written in the first line of the table 92 when the branch point Br2 is detected. Second, the branch point "001" (Br1) is written in the first line after the position of the data "002" is lowered by one line, when the branch point Br1 is detected. Third, the home station HS "100" is written in the first line after the position of the preceding information is lowered by one line as a whole. Finally, "999" is written in the lowermost line of the branch point column. As described above, this is a reference starting point and suggests that TO.ST is just above this point.

In the case where there is a plurality of identical terminal stations TO.ST in the branch information table 80, the situation of the flow chart goes back to the step SP71 again to produce another HS-TO.ST route table 92. Route tables 92 in the number corresponding to the number of the identical stations can be produced. When there is no identical station to be processed, the situation of the flow chart goes from step SP72 to step SP74 and the routine is terminated.

Figure 13:
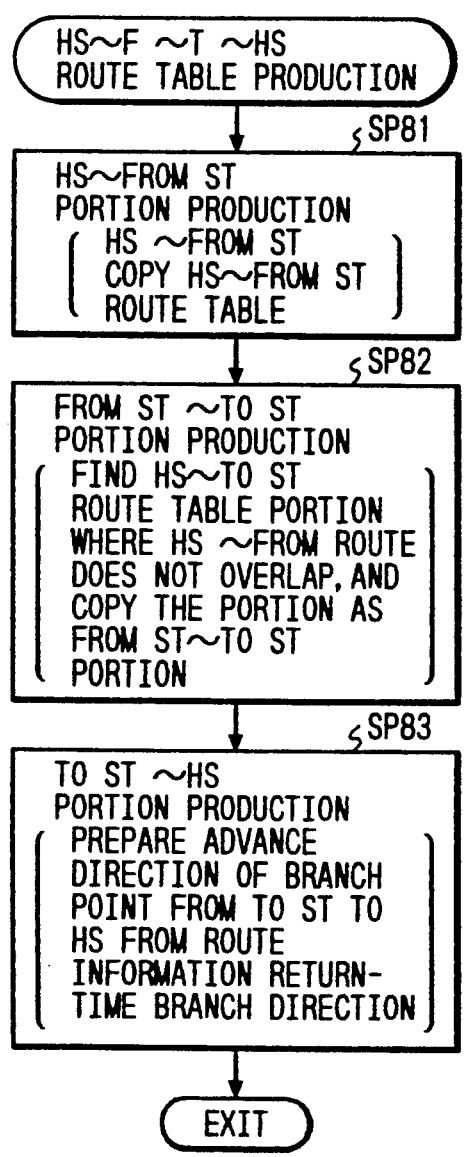

FIG. 13 is a flow chart showing the routine of producing an HS-F/T-HS route table 93. This routine is a routine for producing a route table 93 for registering a route in which the vehicle starts from the home station HS, passes FROM.ST and TO.ST and finally returns to the home station HS. This routine is synthesized from the route table 91 and the route table 92.

First, in step SP81, an HS-FROM.ST route is produced in the route table 93. This is performed by copying the HS-FROM.ST route table 91 to the route table 93. Then, in the step SP82, a route after that, that is, a FROM.ST-TO.ST route, is produced in the route table 93. For example, in the case of FIG. 4, a branch point next to the station ST1 is retrieved by searching the route information table 70, so that it is found that the next branch point is a branch point Br1. In the HS-TO.ST route table 92, the portion after the branch point Br1 ("001") (or in other words the portion above the data "001" in the table 92) is copied to the route table 93. In other words, the portion after the branch point Br1, that is, the portion which does not overlap with the route in the route table 91 is extracted from the route in the route table 92 through examining that the station ST1 is connected to the station ST3 through the branch point Br1, so that this portion is copied to the route table 93. The FROM.ST-TO.ST portion is thus produced. Finally, in the step SP83, the TO.ST-HS portion is produced. That is, the direction of movement (straight-advance or branch) at branch points between TO.ST and the home station HS is read from the return-time branching operation information 64, so that this portion is produced.

Figure 14:
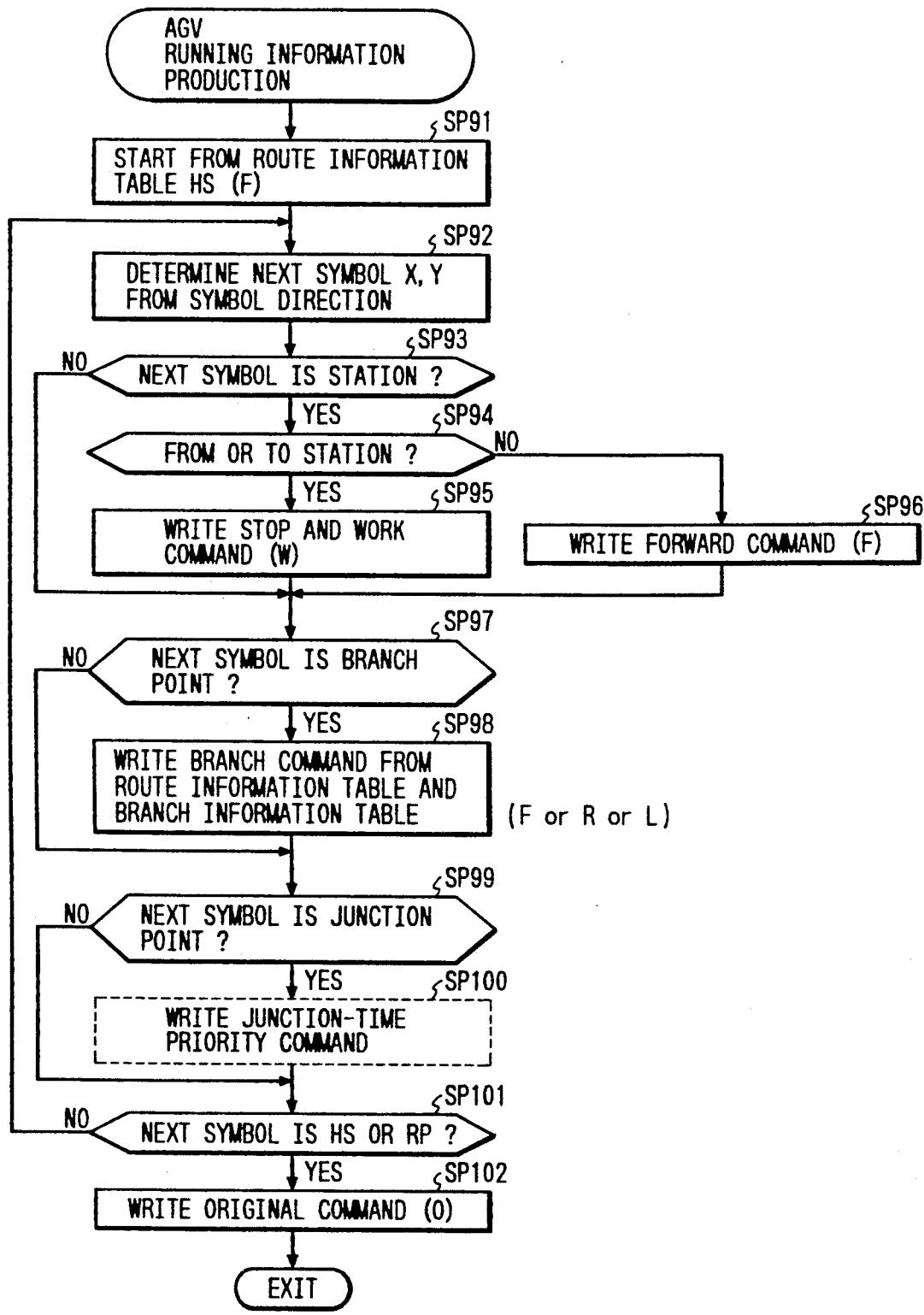
Figure 15:
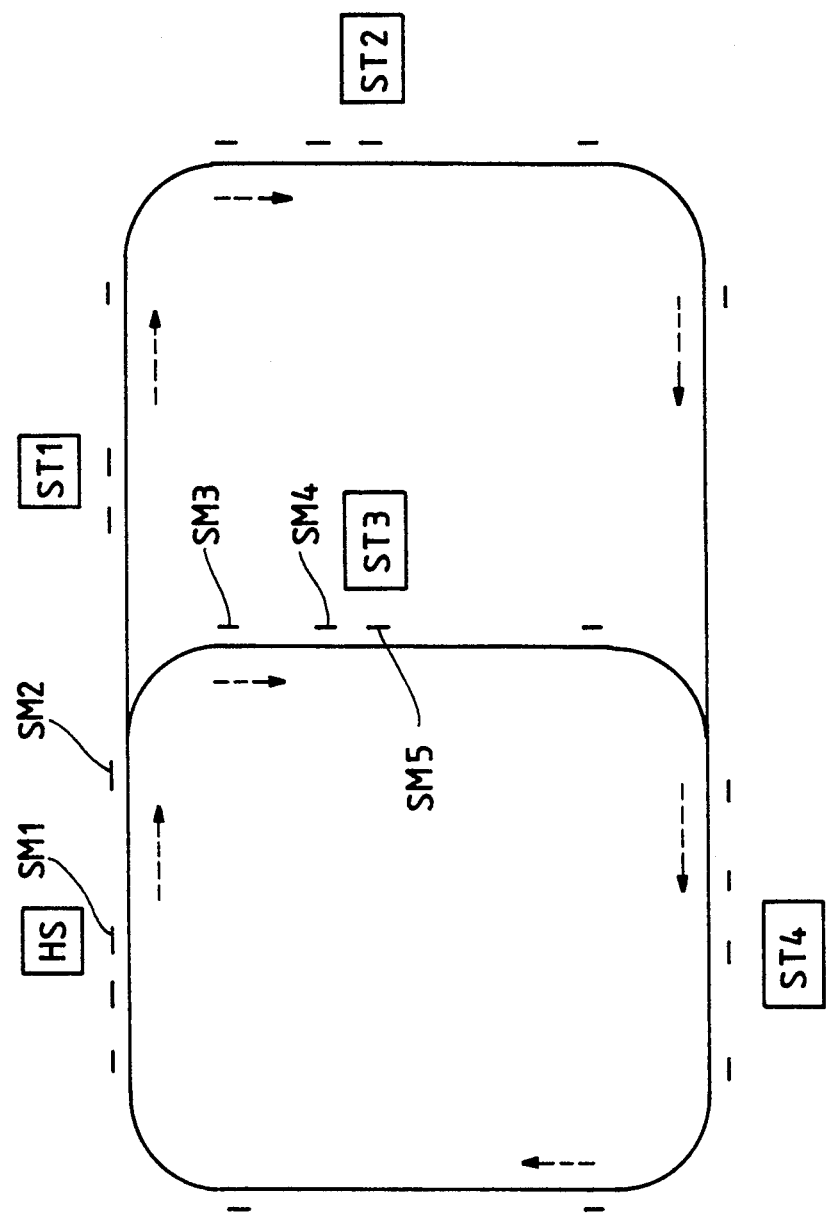
FIG. 15 is a view explaining a conventional automatically guided vehicle running control system.

Finally, FIG. 14 is a flow chart showing the routine of producing a running information table 94 for the guided vehicle 1. This is a routine for producing a running information table 94 by tracing the route information table 70 along the running route in the route table 93.

First, in the step SP91, the routine is started from the home-station HS of the route information table 70. The coordinates of the home station HS can be read from the branch information table 80. Then, in the step SP92, the coordinates (X, Y) of the next symbol block are decided from the direction of the symbol block. For example, in the case of FIG. 4, the coordinates of the home station HS are (3, 4) and the content of the symbol block thereof is "360", so that the direction of the symbol block is upward. Accordingly, the block (3, 3) is selected as the next block.

Thereafter, in the steps SP93 through SP102, the routine is carried out correspondingly to the kind of the symbol block. First, in the case where the next block represents a station, the situation of the flow chart goes from the step SP93 to the step SP94 in which the CPU 22 judges whether the station is FROM.ST/TO.ST or not. When the station is FROM.ST/TO.ST, the situation of the flow chart goes to the step SP95 in which a work command "stop and work" (W) is written in the control information column of the running information table 94. The work command (W) is written as control information in a position decided correspondingly to the order of the FROM.ST/TO.ST signal mark in the running route of the guided vehicle 1. On the contrary, when the symbol block is neither FROM.ST nor TO.ST, the situation of the flow chart goes to the step SP96 in which the CPU 22 writes a forward command (F) in the control information column of the running information table 94. The position in which the forward command is written is decided in the same manner as in the case of FROM.ST.

When the next symbol block represents a branch point, the situation of the flow chart goes from the step SP97 to the step SP98 in which the CPU 22 writes a branch command representing forward-advance (F), right-turn (R) or left-turn (L) in the control information column of the running information table 94 on the basis of the contents of the route information table 70 and the branch information table 80. Also in this case, the position in which the branch command is written is decided correspondingly to signal mark sequence of the branch points. When the symbol block represents a junction point, the situation of the flow chart goes from the step SP99 to the step SP100 in which the CPU 22 writes a priority command at the time of junction in the control information column of the running information table 94. Although above description is made on the case where the step SP100 is provided, the invention can be applied to the case where the step SP100 may be disused according to the kind of the system. Finally, when the symbol block represents a home station HS or a return position RP, the situation of the flow chart goes from the step SP101 to the step SP102 in which the CPU 22 writes an origin command in the running information table 94.

A running information table 94 representing action to be made by the guided vehicle 1 at nodes such as stations, branch points, etc. in the running route is thus completed. When the running information table 94 is completed, the content of the running information table 94 is transferred to the guided vehicle 1, so that preparation for running is thus completed (stage SGJ in FIG. 5).

In respect to the running of the guided vehicle, the following controls except the control based on the running information are made.

(1) Transporting Control of Loads at Respective Stations.
(2) Junction Control for Prevention of Collision at Junction Points in the Case where a Plurality of Guided Vehicles run.

These controls are known techniques, so that it is easy for those skilled in the art to utilize these control techniques in combination with the present invention.

As described above, according to the present invention, map information can be produced automatically through the simple operation of separating the display screen into checker-patterned blocks and placing symbol blocks (unit blocks) suitably in the checker-patterned blocks. Accordingly, production of map information is simplified greatly.

Further, running information is automatically produced on the basis of the map information and F/T information and is given to the guided vehicle. Accordingly, a system for controlling the guided vehicle can be formed easily. Further, intervention of human work is suppressed so greatly that system reliability can be improved.

The foregoing description of preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

We claim:

1. A method of controlling a guided vehicle to run along a desired running route comprising the steps of:
    dividing a display screen into a predetermined grid, wherein said display screen corresponds an area occupied by the running route;
    establishing a plurality of symbol blocks, each symbol block representing a running route segment having a predetermined characteristic, said characteristic being visually represented on said display screen and electronically represented by symbol block data;
    producing a layout diagram corresponding to the running route by entering a selected pattern of symbol blocks into the display screen grid;
    extracting electronic symbol block data for each selected symbol block entered and storing the electronic symbol block data; and
    producing map information corresponding to the stored electronic symbol block data, such that the guided vehicle is controlled along the running route by said map information.

2. A method of controlling a guided vehicle according to claim 1, wherein said plurality of predetermined symbol block characteristics includes, running route stations, running route branching nodes, straight running route portions, curve running route portions, running route junction nodes, and a home station.

3. A method of controlling a guided vehicle to run along a desired running route comprising the steps of:
    dividing a display screen into a predetermined grid, wherein said display screen corresponds an area occupied by the running route;
    establishing a plurality of symbol blocks, each symbol block representing a running route segment having a predetermined characteristic, said characteristic being visually represented on said display screen and electronically represented by symbol block data;
    producing a layout diagram corresponding to the running route by entering a selected pattern of symbol blocks into the display screen grid;
    extracting electronic symbol block data for each selected symbol block entered an storing the electronic symbol block data;
    producing map information corresponding to the stored electronic symbol block data, such that the guided vehicle is controlled along the running route by said map information;
    said plurality of predetermined symbol block characteristics including running route stations, running route branching nodes, straight running route portions, curve running route portions, running route junction nodes, and a home station; and
    said symbol block data comprising a variable portion and a constant portion, said variable portion including station numbers, said constant portion including information relating to the direction travelled by the guided vehicle along the running route portion.

4. A method of controlling a guided vehicle according to claim 2, wherein said map information producing step further comprises the steps of:
    producing a route information table for storing the display screen positions of the selected symbol blocks and information corresponding to the selected symbol blocks; and
    producing a branch information table for storing stations which are passed when the guided vehicle travels a branching option of a respective running route branching node, and stations which are passed when the guided vehicle travels the other branching option of the respective running route branching node.

5. A method of controlling a guided vehicle according to claim 4, further comprising the step of producing route tables for storing which branching option the guided vehicle travels at a respective running route branching node, by searching all running route branching nodes between a designated starting station and a designated terminal station.

6. A method of controlling a guided vehicle according to claim 5, wherein the starting station and terminal station are designated by command information from a command system.

7. A method of controlling a guided vehicle according to claim 6, further comprising the step of producing a running information table for storing operations to be performed by the guided vehicle at each running route branching node, according to said command information, said map information, said route information table, said branch information table and said route tables.

8. A system for controlling a guided vehicle to guide the vehicle along a desired running route, comprising:
    means for displaying a layout diagram corresponding to the running route, said layout diagram being displayed in a predetermined grid pattern such that portions of said layout diagram representing segments of the running route may be designated by their position within the grid pattern;
    means for establishing symbol blocks, each symbol block representing a running route segment having a predetermined characteristic, said characteristic being visually represented on said display means and electronically represented by symbol block data;
    means for selectively entering symbol blocks into the grid pattern to thereby produce a layout diagram;
    means for storing the symbol block data corresponding to the selected symbol blocks;
    means for producing map information corresponding to said stored symbol block data such that the guided vehicle is guided along the running route by said map information.

9. A system for controlling a guided vehicle according to claim 8, wherein said symbol block characteristics include, running route stations, running route branching nodes, straight running route portions, curve running route portions, running route junction nodes, and a home station.

10. A system for controlling a guided vehicle to guide the vehicle along a desired running route, comprising:
    means for displaying a layout diagram corresponding to the running route, said layout diagram being displayed in a predetermine grid pattern such that portions of said layout diagram representing segments of the running route may be designated by their position within the grid pattern;
    means for establishing symbol blocks, each symbol block representing a running route segment having a predetermined characteristic, said characteristic being visually represented on said display means and electronically represented by symbol block data;
    means for selectively entering symbol blocks into the grid pattern to thereby produce a layout diagram;
    means for storing the symbol block data corresponding to the selected symbol blocks;
    means for producing map information corresponding to said store symbol block data such that the guided vehicle is guided along the running route by said map information;
    said symbol block characteristics including running route stations, running route branching nodes, straight running route portions, curve running route portions, running route junction nodes, and a home station; and
    said symbol block data comprising a variable portion and a constant portion, said variable portion including station numbers, said constant portion including information relating to the direction travelled by the guided vehicle along the running route portion.

11. A system for controlling a guided vehicle according to claim 10, wherein said map information producing means further comprises:
    means for producing a route information table for storing the display screen positions of the selected symbol blocks and information corresponding to the selected symbol blocks; and
    means for producing a branch information table for storing stations which are passed when the guided vehicle travels a branching option of a respective running route branching node, and stations which are passed when the guided vehicle travels the other branching option of the respective running route branching node.

12. A system for controlling a guided vehicle according to claim 11, further comprising means for producing route tables for storing which branching option the guided vehicle travels at a respective running route branching node, by searching all running route branching nodes between a designated starting station and a designated terminal station.

13. A system for controlling a guided vehicle according to claim 12, wherein the starting station and terminal station are designated by command information from a command system.

14. A system for controlling a guided vehicle according to claim 13, further comprising means for producing a running information table for storing operations to be performed by the guided vehicle at each running route branching node, according to said command information, said map information, said route information table, said branch information table and said route tables.

* * * * *

UNITED STATES PATENT AND TRADEMARK OFFICE
CERTIFICATE OF CORRECTION

PATENT NO. : 5,305,217
DATED : April 19, 1994
INVENTOR(S) : Katsunari Nakamura, et al.

It is certified that error appears in the above-indentified patent and that said Letters Patent is hereby corrected as shown below:

Title page, item [57], col. 2, 4th line of the Abstract: After "corresponds" insert --to--.

Claim 1, Column 13, Line 58 after "corresponds" insert --to--.

Claim 3, Column 14, Line 29 "an" should read --and--.

Claim 10, Column 15, Line 43 "predetermine" should read --predetermined--.

*Claim 10, Column 16, Line 6 "store" should read --stored--.

Signed and Sealed this

Twenty-fourth Day of January, 1995

Attest:

BRUCE LEHMAN

*Attesting Officer*    *Commissioner of Patents and Trademarks*